(12) United States Patent
Winkler

(10) Patent No.: US 8,046,243 B2
(45) Date of Patent: Oct. 25, 2011

(54) AUTOMATIC INSURANCE ADJUSTMENTS USING REAL WORLD AWARENESS

(75) Inventor: Steve Winkler, San Francisco, CA (US)

(73) Assignee: SAP AG, Walldorf (DE)

(*) Notice: Subject to any disclaimer, the term of this patent is extended or adjusted under 35 U.S.C. 154(b) by 1133 days.

(21) Appl. No.: 11/826,556

(22) Filed: Jul. 17, 2007

(65) Prior Publication Data
US 2009/0024420 A1    Jan. 22, 2009

(51) Int. Cl.
*G06Q 40/00* (2006.01)
(52) U.S. Cl. .......... 705/4; 705/7; 705/26; 705/28; 705/36 R; 235/375; 340/572.1
(58) Field of Classification Search .......... None
See application file for complete search history.

(56) References Cited

U.S. PATENT DOCUMENTS

| | | | | |
|---|---|---|---|---|
| 7,432,811 B1* | 10/2008 | Kuzma et al. | ........ | 340/572.1 |
| 2003/0158758 A1* | 8/2003 | Kanazawa et al. | ........ | 705/4 |
| 2003/0236686 A1* | 12/2003 | Matsumoto et al. | ........ | 705/4 |
| 2004/0078248 A1* | 4/2004 | Altschuler | ........ | 705/4 |
| 2005/0038710 A1* | 2/2005 | Zimmerman et al. | ........ | 705/26 |
| 2005/0137904 A1* | 6/2005 | Lane et al. | ........ | 705/1 |
| 2006/0253306 A1* | 11/2006 | Richardson et al. | ........ | 705/4 |
| 2007/0011033 A1* | 1/2007 | Atkinson et al. | ........ | 705/4 |
| 2007/0294101 A1* | 12/2007 | Dalal et al. | ........ | 705/1 |
| 2008/0097796 A1* | 4/2008 | Birchall | ........ | 705/4 |
| 2008/0154656 A1* | 6/2008 | Kail et al. | ........ | 705/7 |
| 2008/0183636 A1* | 7/2008 | Walsh et al. | ........ | 705/36 R |

FOREIGN PATENT DOCUMENTS
WO    WO2007141792    * 12/2007

OTHER PUBLICATIONS

Loebbecke, Claudia. RFID Becomes Fashionable in the Supply Chain: The Case of Kaufhof and Gerry Weber. AMCIS 2006 Proceedings. © 2006.*

* cited by examiner

*Primary Examiner* — Charles Kyle
*Assistant Examiner* — Robert Niquette
(74) *Attorney, Agent, or Firm* — Finnegan, Henderson, Farabow, Garrett & Dunner LLP

(57) ABSTRACT

An electronic product code information service (EPCIS) interface is provided that allows accessing applications residing on a variety of systems to receive EPC-related data. In setting up an insurance policy, the EPC-related data may be used to determine objects covered by the insurance policy and to valuate the covered objects. An insurance premium may be generated for the insurance policy based on this valuation. In addition, changes to the covered objects may be detected based on the EPC-related data and may be used to automatically adjust the insured value and/or insurance premium.

28 Claims, 9 Drawing Sheets

AUTOMATIC INSURANCE ADJUSTMENTS USING REAL WORLD AWARENESS

TECHNICAL FIELD

The field of the invention relates in general to insurance valuations. More particularly, the field of the invention relates to automatic determination and adjustment of insured value and insurance premium using a real world awareness solution based on sensing technologies.

BACKGROUND

Simplistically, insurance is the equitable transfer of risk associated with a potential loss from one entity to another in exchange for a premium. An entity, such as an individual or a corporation becomes the "insured" party when it transfers risk of loss associated with any tangible or intangible goods owned by the entity to an "insurer." Generally, the assumption of risk by the insurer from the insured takes the form of a contract called an insurance policy. The insurance policy may set forth the goods ensured, the premium, the period coverage, the particular loss event covered, the amount of coverage, and any other suitable information. In accordance with the insurance policy, the insured may be indemnified against covered loss by the insurer.

An insurer typically makes a profit from a policy when the sum of earned premium and investment income generated by that premium exceeds the combination of underwriting expenses and any incurred loss. Underwriting of policies, which includes making determinations of premiums for the covered losses, is a complex and time consuming process. The complexity of underwriting, on a large part, stems from the difficulty associated with predicting the likelihood that a claim will be made against a policy. To this end, insurers use actuarial science to quantify the risks that they are willing to assume and the premium they will charge to assume them. Actuarial science uses statistics and probability to analyze the risks associated with the range of perils covered, and these scientific principles are used to determine an insurer's overall exposure.

While the actuarial models are sophisticated, the insurer's estimated premiums are often less than accurate due to a lack of precise input data about the insured objects. For example, when a home owner obtains insurance on his home and its content, the insurance company may determine the premium based on the sales price of the home and the home owner's claim of properties within. Without conducting detailed inspections, the insurance company is without actual acknowledge of the correct value of the properties as a whole. Also, the properties within the home may change over time, either increasing or decreasing the total home value. But such changes do not automatically trigger a re-evaluation of the insurance policy unless either the insured or the insurer takes an affirmative step to request it.

Additionally, changes to the home content may change the risks to which the home is exposed. As an example, an aged furnace or one that is no longer in compliance with building code may subject the home, as a whole, to greater fire loss risk. As another example, storage of flammable items in the portion of the house that is subject to heat (e.g., in the utility room) may significantly increase the fire lost risk of the home. Lack of knowledge concerning these variable conditions significantly affects the accuracy of the issuer's loss projection, which consequently affects the valuation of the insurance premium.

Similarly or more significant challenges exist in commercial policy valuations because commercial properties tend to undergo more frequent changes. As an example, a warehouse insurance policy may cover content loss within the warehouse at any given time. The warehouse content may include a changing combination of equipments, inventories, and a variety of other items. The value of the warehouse as a whole may vary significantly from one day to another. Moreover, risk of loss may vary even among similarly situated warehouses housing similar contents depending, for example, on the arrangement of the content.

In addition to the above, the lack of accuracy in the determination of the total insured amount may be a major concern for the insured. On the one hand, if the insured amount is evaluated to be too high in comparison to the actual value of the insured goods, the insured party may be forced to pay a much higher premium than it is necessary to cover the potential loss. On the other hand, if the insured amount is set too low, the insured party may be exposed to uninsured risks.

In view of the various concerns surrounding insurance policy valuation, it would be beneficial from the perspectives of both the insured and the insurer to obtain accurate knowledge of the value, condition, arrangement, and other information associated with the insured location and/or objects, especially when changes occur (e.g., a reduction in inventory, an addition of a dangerous substance, or any other change that would potentially affect the loss value). It would be further beneficial if such information may be automatically used to dynamically update the insurance policy valuation, including, for example, the insured amount and the insurance premium.

SUMMARY

Consistent with the principles of the present invention, a real world awareness solution automatically valuates and adjusts values of an insurance policy based on Electronic Product Code-related data associated with the insured subjects. More specifically, an electronic product code information service (EPCIS) interface allows accessing applications residing on a variety of systems to receive Electronic Product Code-related data. In setting up an insurance policy, the EPC-related data may be used to determine objects covered by the insurance policy and to valuate the covered objects. An insurance premium may be generated for the insurance policy based on this valuation. Moreover, changes to the covered objects may be detected based on the EPC-related data. Impact of these changes on the insurance policy may be valuated and used to automatically adjust the insured value and/or insurance premium.

In one embodiment, an individual and/or an organization may initiate setup of an insurance policy. The specific objects involved in the insurance policy may be determined, for example, based on shared EPC-related data obtained via an EPCIS interface. As an example, for a home insurance policy, information associated with the home owner may be obtained. Subsequently, information on the specific objects associated with the consumer's home address may be accessed through the EPCIS interface. A collection of such object information may be gathered from a variety of sources (e.g., a retailer from which the consumer has purchased items for the home) to create a list of objects within the consumer's home. Similarly processes may be used to gather information on a list of items currently residing in a commercial location (e.g., a warehouse), if the insurance policy is for an enterprise.

The objects identified may then be valuated based on the EPC-related information associated with these objects. The relevant EPC-related information may include, for example, the manufacturer, production date, special storage information, indication of whether the object (e.g., a television) has been repaired, how the object was transported, and other information that may impact the value of the object. Using this information, a value for the object may be determined, taking into account, for example, the age of the object (e.g., derived from the production date), the condition of the object (e.g., derived from the various handling of the object), the original retail value of the object, and any other suitable EPC-related information.

The valuation above may be used, in combination with other considerations, to determine an insurance premium for the insurance policy. Some additional considerations derivable from the EPC-related information may include, for example, whether there are risks associated with the combination of objects stored together (e.g., whether flammable items are stored in the same location as heat sources); whether the values of the stored items change drastically over a short period of time (e.g., perishable); and/or any other suitable considerations.

In some embodiments, the insurance policy valuation may also be adjusted based on shared EPC-related information. First, a change event associated with an object covered by an insurance policy may be detected. In response to a change event detection, the insurance policy may be automatically revaluated to determine if the change has any impact on the insured value and/or the insurance premium. This determination of impact may be based on, for example, EPC-related information associated with the object involved in the change event. The EPC-related information to be considered may include, for example, the changed object's retail value, age, handling history, and any other suitable factors. Other useful EPC-related information may include, for example, factors contributing to the changed environment (e.g., the addition of flammable materials) and/or any other suitable information. The current insurance premium and/or insured amount may then be automatically adjusted to reflect the impact of the change event in accordance with the revaluation.

Further features and embodiments of the present invention will become apparent from the description and the accompanying drawings. It will be understood that the features mentioned above and those described hereinafter may be used not only in the combination specified but also in other combinations or on their own, without departing from the scope of the present invention. It will also be understood that the foregoing background, summary, and the following description of the systems consistent with the principles of the present invention are in no way limiting on the scope of the present invention and are merely illustrations of a preferred embodiment of the present invention.

BRIEF DESCRIPTION OF THE DRAWINGS

Referring now to the drawings, in which like numerals represent like elements throughout the several Figures, aspects of the present invention and the exemplary operating environment will be described.

DETAILED DESCRIPTION

Figure 1:
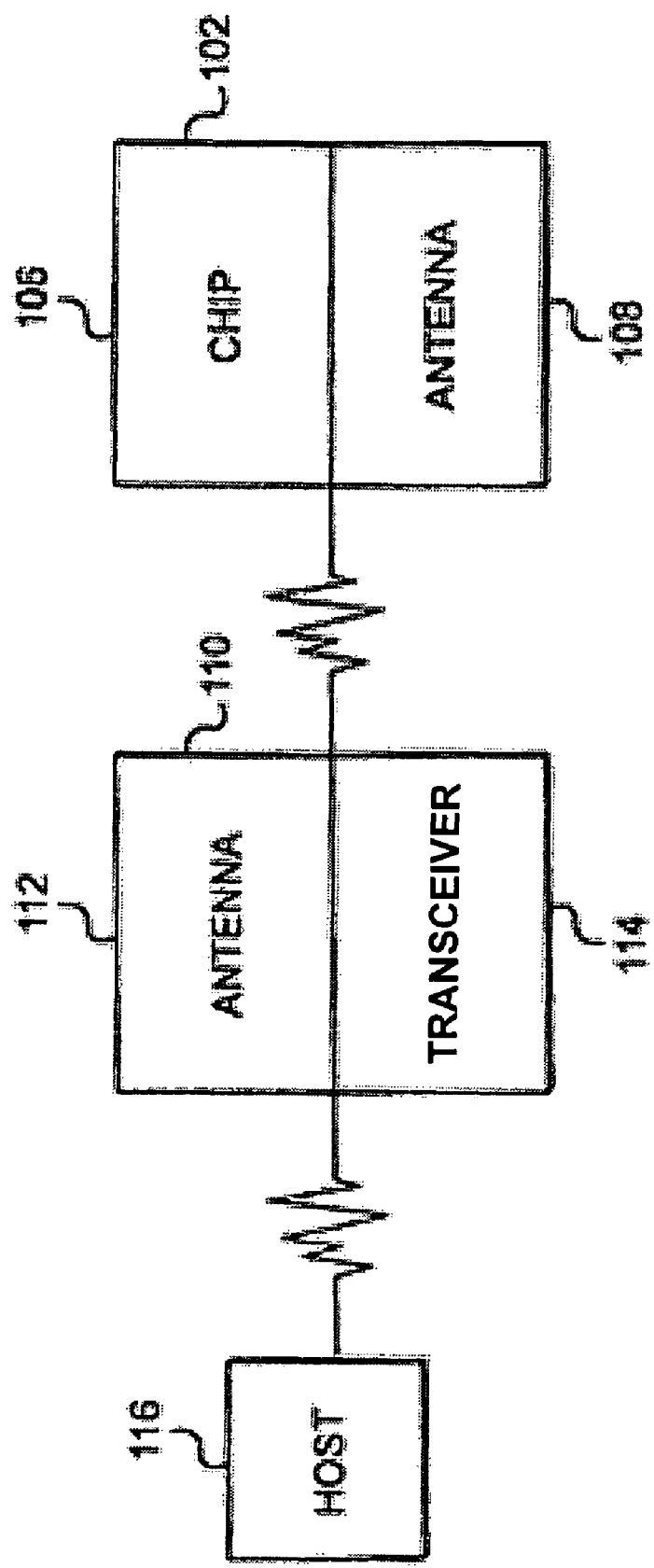
FIG. 1 is a block diagram of an illustrative RFID system for facilitating reading and writing to a read/write RFID tag.

The following detailed description refers to the accompanying drawings. Wherever possible, the same reference numbers are used in the drawings and the following description to refer to the same or similar parts. While several exemplary versions and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding stages to the disclosed methods. Accordingly, the following detailed description does not limit the invention. Instead, the proper scope of the invention is defined by the appended claims.

Consistent with the principles of the present invention, a real world awareness solution is provided that automatically valuates and adjusts values associated with an insurance policy based on real-time data obtained on the insured subjects and environments. A real world awareness solution has the ability to sense information in real time from people, IT sources, and physical objects through technologies like radio frequency identification (RFID), bar codes, sensor technologies, etc. At its most fundamental level, a real world awareness solution may be thought of as techniques that enable intelligent applications to obtain real-time information about the locations, the movements, and the states of objects out in the real world and to appropriately react to this information. In most situations, this information is collected by attaching some kind of sensor (e.g., an RFID tag) to each object and using wireless scanners to briefly communicate with that sensor as the object moves from place to place. Some of the technologies suitable for object sensing, such as RFID, have existed for decades, but were used in narrower applications. As the cost of such technology continues to drop, especially with the arrival of the new polymer-based technology, there is now an opportunity to meaningfully use such technology on a much broader scale.

For simplicity, radio frequency identification (RFID) technology is described in this application as the exemplary technology for supporting a real world awareness solution for insurance policy valuation. Those skilled in the art will recognize that any other suitable sensing technology may be used without departing from the spirit of the present invention.

As an overview, RFID works by enabling a wireless exchange of information between a tagged object and a reader/writer, which in turn allows a host to process the information associated with the tagged object. FIG. 1 shows one example of such an RFID system. Three components are included in this basic RFID system 100. First, one or more tags 102 or transponders may be deposited on an item to be tracked. The item may be any suitable item known to those skilled in the art upon which an RFID tag may be attached, such as retail merchandise. The tags 102 may vary in shapes, sizes, and materials to suit the conditions of the item. Each RFID tag 102 may include two components, a computer chip 106 and an antenna 108. Appropriate information associated with the tagged item, including, for example, item name, description, or any other suitable item-related information, may be stored on the computer chip 106 and/or a server away from the tag.

Depending on the application, the tags 102 may be passive, active, or battery assisted. Passive tags generally utilize the power derived from the signals sent by a reader to respond to the reader. Active tags power their transmissions with an attached battery, while battery-assisted tags use an attached battery to power chip electronics, but does not use the battery for transmission. While the less costly passive tags are most frequently used in connection with supply chain management systems, active tags play a major role in marking shipping containers etc. in the supply chain management systems.

Functionally, tags 102 may fall into two categories, read-only or read/write. Read-only tags are programmed with a fixed set of information during manufacturing, and this information cannot be altered at a later time. Read/write tags, on the other hand, allow writing and/or rewriting of its information by an authorized user. Some read/write tags may include a read-only portion in which certain information may be stored and protected while allowing other information stored in a writable portion to be modified. Some examples for modifying the read/write tags, for example, to effect tracking of a product from manufacturing to retail, will be discussed in more detail below.

One or more read/write devices or interrogators 110 may be used to communicate with the tags 102. The read/write device 110 may include an antenna 112, a transceiver 114, and any other suitable components for facilitating reading and writing to tags 102. Typically, to communicate with a particular tag or set of tags 102, the read/write device 110 sends out through transceiver 114 and antenna 112 an RF signal in the frequency to which the target tags 102 are tuned. In response to receiving the signal, the targeted tags 102 respond by transmitting at least a part of their stored data. Upon receiving the data transmitted by the tags 102, the reader/writer 110 decodes the data and may transfer the data to a host computer system 116 for processing. The reader/writer 110 may either be fix-positioned or portable and may be either wired or wireless.

An RFID tag often contains data in the form of an Electronic Product Code (EPC). The EPC is essentially a unique serial number that is assigned to the item to which the RFID tag is affixed or otherwise associated. The tag may also contain EPC-related information, i.e., any suitable information that has been associated with the item bearing an EPC. For example, RFID tags may be attached to individual products as they come off the production line at a manufacturer's factory. These tags may contain data such as the date of production, special product care instructions (i.e., a special temperature that the product is to be kept at), and/or any other suitable information that the manufacturer wishes to have associated with the product. The manufacturer may store the tag information in its own database. Scanning of the tags as the products leave the factory, for example, via a tag reader fixed to a door, may inform the manufacturer which products are no longer stored in the factory. This information may be used to update the manufacturer's database, which may in turn allow the manufacturer to monitor, manage, and/or optimize its business.

Additionally, because today's businesses are interconnected with each other in a plethora of ways, RFID data may be beneficially shared with other enterprises/organizations such as enterprises/organizations situated down the supply chain from the manufacturer. In one particular scenario, a retailer that purchases from the manufacturer may wish to gain access to the manufacturer's stored RFID data, including production date and shipped date data. Using this data, the retailer may, for example, determine the best time to schedule its quarterly shipment from the manufacturer to ensure that the manufacturer will have enough products on hand to satisfy the retailer's needs. In another scenario, the retailer may wish to gain access to the manufacturer's stored RFID data, for example, with regard to the special condition under which the products have been kept (i.e., temperature for perishable food). Using this data, the retailer may determine whether an expiration date can be properly applied because the products have been kept according to the manufacturer's special instructions.

In addition to sharing EPC-related data associated with enterprise/organizations, EPC-related data associated with end consumers may also be shared. For example, when a consumer purchases a product bearing an EPC at a retailer, the retailer may gather information about the consumer and associate the information with the EPC. As one example, the retailer, at the cash register, may acquire information such as the consumer's name, address, credit card information, and other personal information. If desired, the retailer may also obtain and/or infer additional information about the consumer using the above personal information. For example, the retailer may learn the consumer's credit history using the consumer's credit card information, may use the consumer's address and/or credit information to infer income, may use the consumer's name to acquire past purchase patterns from other enterprises/organizations, etc. The retailer may then associate all this consumer information with the EPC of the product purchased and may share the EPC-related consumer data with other enterprises/organizations.

In view of the above, the real world awareness solution for automatic insurance valuation and adjustments may be based on an EPC-related data sharing scheme that provides information on the insured objects and environments. One example of such a data sharing scheme is an Electronic Product Code Information Service (EPCIS) that enables participating enterprises/organizations and individuals to share EPC-related data (e.g., obtained from RFID tags). It will be understood that while EPCIS is provided as a specific example of a sensing data sharing scheme, any other suitable service based on any other suitable standard may be implemented without departing from the spirit of the present invention.

At a high level, the Electronic Product Code Information Service (EPCIS) specifies a standard interface for accessing EPC-related information. EPC-related information may be any suitable information that has been associated with an object bearing an Electronic Product Code (EPC), which usually involves a unique serial number that is assigned to the object via an RFID tag.

Typically, EPC-related data falls into two broad categories. One category involves timestamped event data that is collected throughout the lifecycle of an object. This type of event data may include, for example, observation data associated with tag readings (e.g., time data associated with scanning of the RFID tag of a product at a retail register), measurement data (such as sensor readings, temperature history, etc.), location history, business transaction history, and any other timestamped event data. Another category of EPC-related data involves attribute data that is, for example, a fixed part of the RFID tag and is not continuously updated. This type of data may include, for example, manufacturing date, expiration date, and any other data that is specific to the product with which the EPC is associated and does not require continuous updating.

Unlike other networks that are concerned with synchronization of data about products (i.e., the GDSN, UCCNet, etc.), EPCIS is primarily focused on sharing of serial-level EPC-related data via a much more distributed architecture. What EPCIS provides is a technical specification for a data communication interface in a model that allows different applications to leverage EPC-related data both within and across enterprises/organizations. In particular, the EPCIS enables the capturing and querying of EPC-related data using a defined set of service operations and associated EPC-related data standards, all combined with appropriate security mechanisms that satisfy the needs of user enterprises/organizations. In other words, the EPCIS places no restrictions on the different enterprises/organizations' underlying database, underlying operating system, underlying programming language, or underlying information system integration.

With regard to the standard interface for accessing the EPC-related data, EPCIS supports both on-demand polling access and a "push" model, which deals with standing queries. Depending on how the security for each individual EPCIS implementation is configured by, for example, an enterprise/organization that owns the particular EPCIS, rights may be granted for a user enterprise/organization of the EPCIS to define its own standing queries or the user enterprise/organization may only have the option of subscribing to an existing query, which, for example, has been pre-defined by the enterprise/organization provider of that particular EPCIS service. In many or most cases, one or more databases of EPC-related data is involved, though elements of the EPCIS could be used for direct application-to-application sharing without persistent databases.

Figure 2:
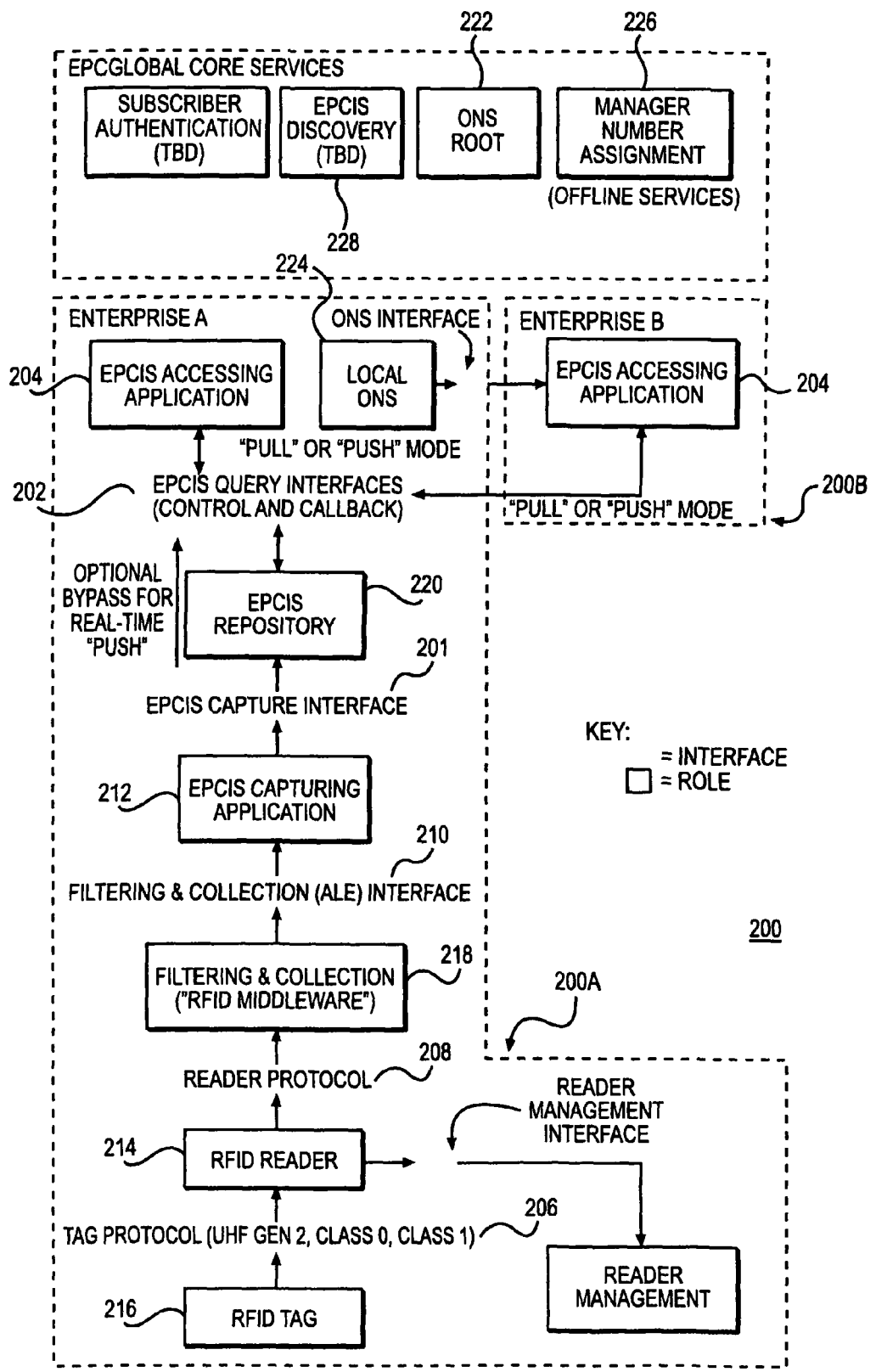
FIG. 2 is a schematic block diagram illustrating the relationships within an EPCglobal Architecture Framework.

FIG. 2 is a schematic block diagram illustrating the relationships within an EPCglobal Architecture Framework 200. EPCglobal generally refers to an organization set up to achieve world-wide adoption and standardization of Electronic Product Code (EPC) technology. The main focus of the EPCglobal Architecture Framework 200 is to create both a world-wide standard for RFID and sharing of EPC-related data via the EPCglobal Network.

In FIG. 2, boxes denote roles played by hardware and/or software components of the system while the bars that have shadows denote interfaces governed by the various standards of EPCglobal, including the EPCIS. EPCglobal Architecture Framework 200 is divided between hardware and software components in Enterprise A, labeled 200A in FIG. 2, and Enterprise B (200B).

The flow of data from an RFID tag 216 in Enterprise A is depicted from the bottom to the top of 200A in FIG. 2. At the base bevel, RFID reader 214 makes one or more observations of RFID tag 216 when RFID tag 216 comes within the read zone of RFID reader 214, for example, when a product bearing RFID tag 216 passes through a warehouse door where RFID reader 214 is mounted. These raw EPC observations are governed by Tag Protocol 206. The raw tag observations made by RFID reader 214 are then delivered in accordance with the definition provided by Reader "Wireline" Protocol Interface 208 to Filtering & Collection 218, which is often referred to as the RFID middleware. The time interval for the collection of the raw tag observations by Filtering & Collection 218 may be determined by, for example, events defined by EPCIS Capturing Application 212. A suitable event may be, for example, the tripping of a motion detector on a product line.

The delivery of the filtered and collected tag read data from Filtering & Collection 218 to EPCIS Capturing Application 212 may be performed according to the control and definition specified by Filtering & Collection Interface 210. EPCIS Capturing Application 212 may supervise the operation of the lower-level architectural elements, for example, by providing filtering criteria to Filtering & Collection 218, and may provide business context by coordinating with other sources of information involved in executing a particular step of a business process. In essence, EPCIS Capturing Application 212 understands the business process steps during which data capture takes place and provides intelligent guidance with regard to what actions to take in connection with the data capture. For example, EPCIS Capturing Application 212, while coordinating a conveyor system with filtering and collection events, may check for exceptional conditions and take corrective action such as diverting a bad batch of products into a rework area.

Above EPCIS Capturing Application 212, at the top portion of EPCglobal Architecture Framework 200 resides the EPCIS Interfaces. These EPCIS Interfaces may include EPCIS Capture Interface 201 and EPCIS Query Interface. The EPCIS Interfaces provide EPC-related data to enterprise/organization-level roles such as EPCIS Repository 220 and EPCIS Accessing Application 204 both inside an enterprise/organization and outside of it, for example, at another enterprise/organization.

The EPCIS interfaces may include three specific interfaces: EPCIS Capture Interface 201, EPCIS Query Interfaces 202, and EPCIS Query Callback Interface, which is shown as a part of Interface 202 in FIG. 2. EPCIS Capture Interface 201 may define the delivery of EPCIS events from EPCIS Capturing Applications 212 to other roles that utilize the event data in real time, including EPCIS Repository 220. EPCIS Repository 220 may in turn store events generated by one or more EPCIS Capturing Applications, and may make these events available for later query, for example, by EPCIS Accessing Applications 204. EPCIS Capture Interface 201 may also "push" data in real time to EPCIS Accessing Applications 204.

EPCIS Query Control Interface 202, on the other hand, defines a means for EPCIS Accessing Application both inside and outside of the enterprise/organization to obtain EPCIS data subsequent to capture, for example, by first interacting with EPCIS Repository 220. Such interactions may take two forms. In the "on-demand" form, an EPCIS Accessing Application 204 may make a request through the EPCIS Query Control Interface 202 and receive a response based on EPC-related data immediately. In "standing request" or "asynchronous" mode, an EPCIS Accessing Application 204 may establish a subscription for a periodic query. Each time the periodic query is executed, the resulting EPC-related data may be delivered or "pushed" to the EPCIS Accessing Application asynchronously via EPCIS Query Callback Interface 202. EPCIS Query Callback Interface 202 may also be used to deliver information immediately upon capture, for example, in the form of a "real-time push."

The fact that the EPCIS Interfaces are situated at the top portion of the EPCglobal Architecture Framework has several advantages. First, each of the interfaces in the lower framework levels insulates the higher levels of the framework from being weighed down by unnecessary details of how the lower levels are implemented. As an example, Reader Protocol Interface 208 insulates the higher levels from knowing what RF protocols are in use and/or what reader models are being used. Similarly, Filtering & Collection Interface insulates the higher levels from the design specifics with regard to how tags are sensed. For example, if a particular sensing arrangement is replaced with another, the events collected at Filtering & Collection level 218 should remain the same because of this insulation effect.

At the highest level, EPCIS insulates enterprise/organization applications such as EPCIS Accessing Applications 204 from having to understand the details in a business process. As an example, regardless of how an EPCIS event specifying that a particular situation occurred in a particular pallet was determined, whether by the observation and recordation of a human operator, by filtering of triggered events sent by a reader protocol interface to the Filtering and Collection level, or by any other method, the EPCIS event that is presented, for example, an EPCIS Accessing Application 204, remains unchanged.

The EPCIS Interfaces have a number of similarities to the interfaces at the lower levels of the EPCglobal Architecture Framework. However, the EPCIS Interfaces also differ from the elements at the lower levels of the EGCglobal Architecture Framework in a number of ways.

First, EPCIS works with historical EPC-related data as well as current EPC-related data. This is different from the lower levels of the framework, which are directed to the collection and processing of real-time EPC-related data.

Second, EPCIS works with business contexts and not just raw EPC-related observations. The business contexts provide a suitable lens through which the raw EPC-related observations may be analyzed, for example, to enable intelligent inferences to be made based on the observations within certain business applications. For example, an observation provided by Filtering & Collection 218 may indicate that a particular product bearing an EPC was seen at a particular reader at a particular time. This information while specific, has no business context. At the semantically higher level of the EPCIS, the above observation may be tied into a business context that provides the fact that the reader is located at a warehouse door, where the reader is triggered when new products arrive on a conveyor belt. Using this business context, the above observation may result in the inference that the product bearing the EPC is now stored in the warehouse and ready for shipping to retailers. In this way, the EPCIS incorporates into the event observation an understanding of the business context in which the EPC data were obtained so as to provide intelligent information that is useful in view of that business context. Because EPCIS allows storage of real-time EPC-related data, for example, in an EPCIS Repository 220, event information at the EPCIS level need not be directly tied to specific physical tag observations. For example, the EPCIS may provide inventory information that is generated based on inferences from history data stored within an EPCIS Repository 220.

Additionally, EPCIS is able to operate within a much more diverse network environment when compared to the elements at the lower levels of the EPCglobal Network Architecture Framework. EPCIS's adaptability to a multi-faceted network is particularly valuable when enterprises/organizations that have very different systems or network configurations wish to share data. In this regard, the insulation of EPCIS from the various lower levels within the framework, as discussed above, becomes particularly useful in shielding different implementations at the lower levels from accessing applications. In other words, EPCIS incorporates semantic information about business processes into raw EPC data and provides intelligent inferences based on raw and historical EPC data.

In this way, EPCIS prevents and insulates applications that query and analyze information provided by EPCIS from understanding the detailed implementations and business processes within an enterprise/organization.

It should be noted that consistent with FIG. 2, EPCIS Accessing Applications 204 may reside either within the same network as the EPCIS Interfaces or within the systems of, for example, another enterprise/organization. In some embodiments, EPCIS Accessing Applications 204 residing within the systems of another enterprise/organization, such as Enterprise B (200B), may be granted access to a subset of the information that is available from an EPCIS Capturing Application 212 or within an EPCIS Repository 220. Details for granting access to a subset of the information via an enterprise/organization based access approach will be discussed in later sections.

Other elements that are complementary to the essential elements of EPCIS may also be included in the EPCglobal Architecture Framework 200. Examples of such elements may include Object Naming Service (ONS) Root 222 and Local ONS 224, which are network services that are used to look up pointers to the EPCIS provided by an enterprise/organization that is responsible for an EPC associated with a product. A search for pointers to such an EPCIS may be based on, for example, an EPC Manager Number such as one assigned by Manager Number Assignment 226 or based on the full Electronic Product Code. Typical utilizations of an ONS may include, for example, a retailer looking up an EPCIS that provides product data from a manufacturer for a product having a given EPC.

EPCIS Discovery 228 may be another complementary element to EPCglobal Architecture Framework 200. At a high level, EPCIS discovery 228 is capable of locating all EPCIS Repositories that may have data associated with a particular EPC. This discovery service is useful, for example, when an accessing application has no idea which EPCIS has EPC-related data that is relevant to a query that it wishes to perform. In one example, a retailer may wish to know the transport history of a product but has no idea which parties have participated in the transportation and storage of the product since the product left the manufacturer.

It should be noted that a single physical software or hardware component may play more than one role consistent with FIG. 2. For example, an enterprise/organization application such as a Warehouse Management System may simultaneously play the role of EPCIS Capturing Application 212, for example, to detect EPCs during product movement at loading time, and the role of EPCIS Accessing Application 204, for example, to analyze EPC-related data for making business decisions.

It should also be noted that FIG. 2 is merely an illustration of a suitable EPCglobal Architecture Framework. Appropriate additions, modifications, and deletions may be incorporated without departing from the spirit of the present invention.

It is apparent from the above description of the general EPCglobal Architecture Framework that EPCIS, which provides a more comprehensive insulation of technical implementations and business processes at the lower level, needs a complementary richer set of access techniques. For example, the incorporation of business context will require that the EPCIS be capable of handling a variety of data types and be flexible enough so that it may be expanded or extended to accommodate new and different business contexts. Also, in anticipation of widely different systems and networks that the EPCIS must adapt to across enterprises/organizations, the EPCIS must be structured carefully so as to maintain consistency and interoperability.

With these requirements in mind, the EPCIS may be implemented in accordance with a framework that is layered, extensible, and modular. With regard to being layered, the structure of data in connection with EPCIS may be defined separately from the particulars of data access services and interface protocols. This separation enables the EPCIS data to maintain consistent meaning across the enterprises/organizations over time regardless of changes that might be made to the data access services or the interface protocols. This may also enable the separately defined EPCIS data to be used in other frameworks, such as an EDI framework.

Figure 3:
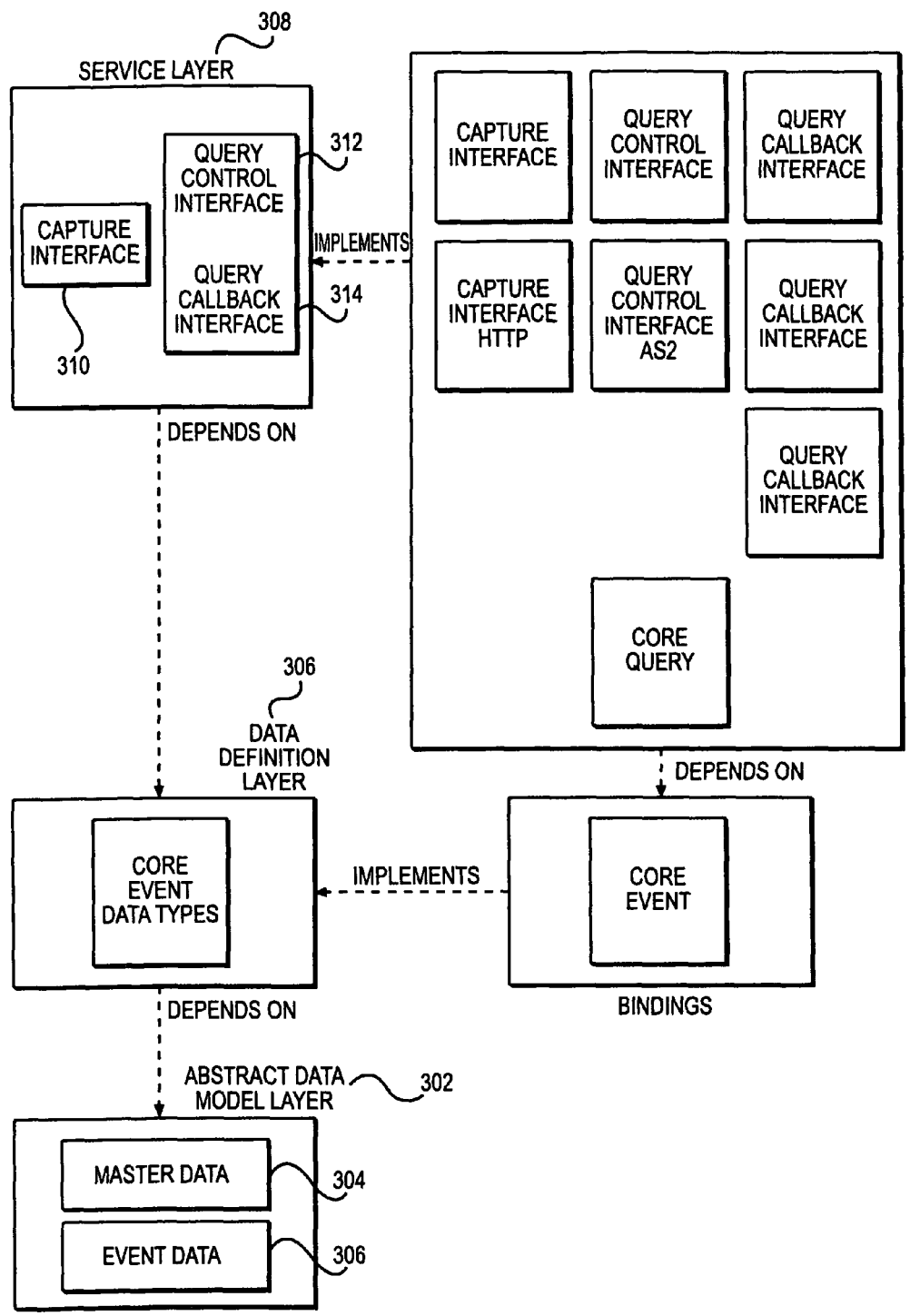
FIG. 3 shows a block diagram of suitable layers that may be implemented in connection with an EPCIS framework.

FIG. 3 shows a block diagram of suitable layers that may be implemented in connection with an EPCIS framework. At the bottom level of this framework lies Abstract Data Model Layer 302. This layer may define the generic structure of EPCIS data and may be made non-extensible without revising the EPCIS core specification. By not allowing extension to be added freely, Abstract Data Model Layer 302 maintains a consistent set of general requirements for creating data definition.

Figure 4:
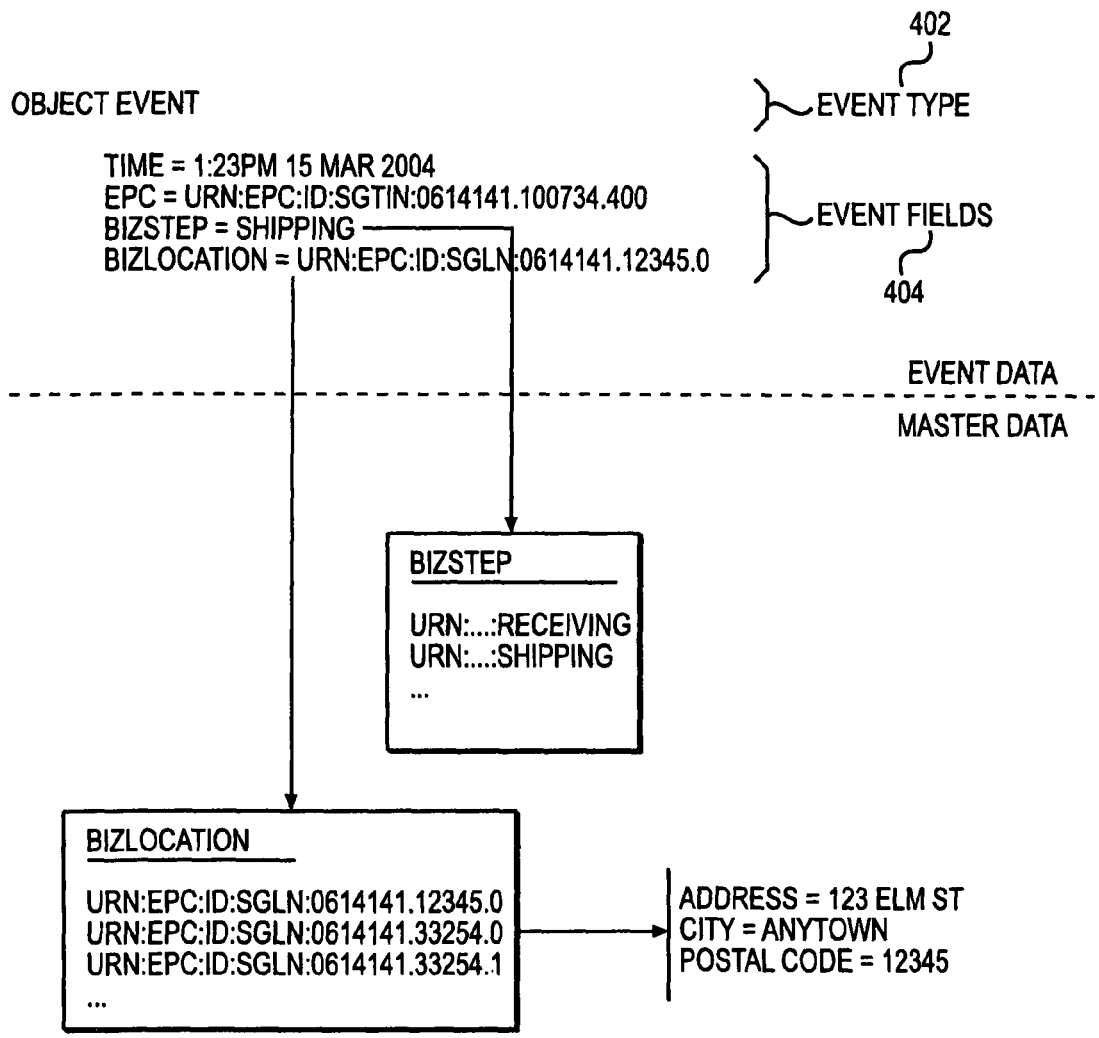
FIG. 4 shows an illustrative set of master data and event data consistent with the EPCIS framework.

Generally, Abstract Data Model Layer 302 may include two types of data: master data 304 and event data 306. Event data 306 may be any suitable data that is generated during the business processes and captured, for example, by an EPCIS Capturing Interface, such as interface 201 of FIG. 2. An example of event data may be a specific observation of an EPC at a particular time by a particular reader. Event data 306 may be made available for querying, for example, through an EPCIS Query Interface, such as interface 202 of FIG. 2. An illustrative set of event data is shown in the top portion of FIG. 4. In this example, the event data describes a specific EPC that has been observed at a specific bizLocation at a specific time during a shipping step.

Master data 304 does not deal with actual observations of events, but is additional data that defines a business context for interpreting the event data. As an example, master data 304 may include identifiers for locations, business process steps, and other business context that can provide business meaning to the raw observations contained in event data 306. An illustrative set of master data is shown in the bottom portion of FIG. 4. In this example, the master data lays out all the possible bizSteps from which the shipping step was chosen and all the possible BizLocations from which the actual BizLocation in the event data was chosen, and how those BizLocations may correspond to actual locations.

Referring back to FIG. 3, Data Definition Layer 306 may be found above Abstract Data Model Layer 302. Data Definition Layer 306 may define at a higher level what data is allowed to be exchanged through EPCIS, what type of abstract structure this data should take on, and what the data means. Data definitions made in Data Definition Layer 306 conform to the set of rules specified in Abstract Data Model Layer 302 below. As an example, event types, as illustrated by event type 402 in FIG. 4, may be defined in Data Definition Layer 306 and may specify a list of standard event fields 404 for each event type. An event type may also include other subclass event types. The event types 402 defined may be consistent with the rules associated with raw event data 306 specified in Abstract Data Model Layer 302.

Service Layer 308 may be found above Data Definition Layer 306 in FIG. 3. This layer defines the service interfaces that clients of EPCIS interact with. According to one suitable approach, the interface definitions in the service layer may be specified abstractly using UML. Some illustrative interfaces that may be defined in this layer may include, for example, EPCIS Capture Interface 310, EPCIS Query Control Interface 312, and EPCIS Callback Interface 314.

In addition to being layered, the core specifications of the EPCIS, which may include, for example, various data types and operations that are applicable across enterprises/organizations, may be made extensible to include other data types, operations, etc. that are particular to a particular enterprise/organization or industry. This ability to make additions to the core specifications strengthens the concept of a more standardized core, because it allows particularities that do not conform to the standard core to be included as extensions. The layering and extensibility mechanisms allow different parts of the EPCIS to be specified by different documents and at the same time promote coherence across the entire framework to ensuring standardization.

Figure 5:
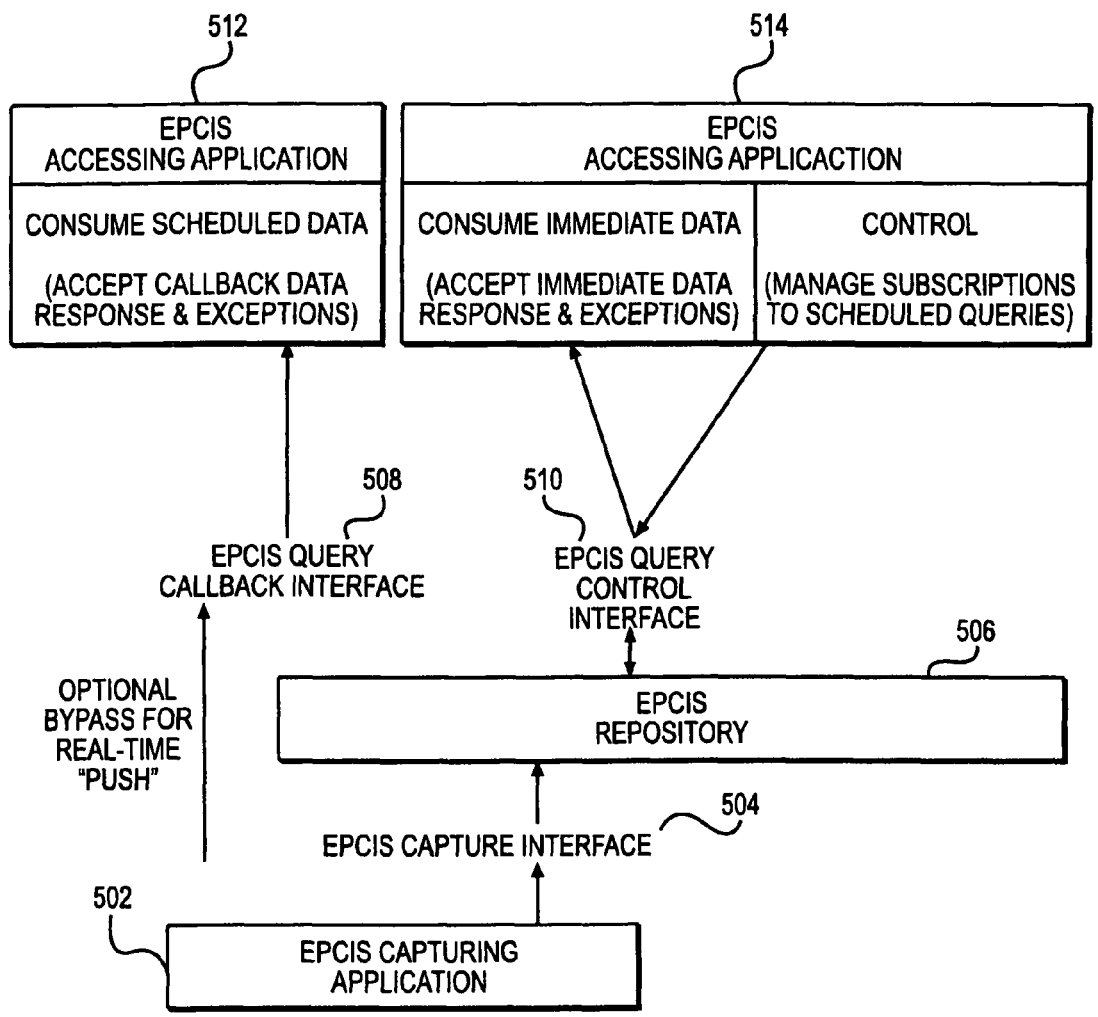
FIG. 5 is a block diagram of one suitable arrangement for allowing EPCIS interfaces to interact with each other and with EPCIS accessing applications.

On a more specific level, FIG. 5 provides a block diagram of one suitable arrangement for allowing the EPCIS interfaces to interact with each other and with EPCIS accessing applications. At the lower level, EPCIS Capture Application 502 may deliver core events to EPCIS Capture Interface 504. A capture operation may be permitted or prevented based on the success of the mutual authentication. As an example, "message bus" technology may be used by EPCIS Capture Interface 504 to interconnect different distributed system components and provide a channel for in-order delivery of messages by designating a particular message bus channel, for example, to deliver EPCIS events from an EPCIS Capture Application 502 to EPCIS Repository 506.

EPCIS Query Callback Interface 508 and EPCIS Query Control Interface 510 may enable EPCIS data to be retrieved by EPCIS Accessing Applications 512 and 514. In particular, EPCIS Query Control Interface 510 allows EPCIS Accessing Application to retrieve data on-demand and to enter subscriptions for standing queries, which may be any suitable queries that are pre-determined and run, for example, periodically or in response to certain triggering events, to return EPCIS data. Results of such standing queries may be delivered to EPCIS Accessing Application 512 via EPCIS Query Callback Interface 508. Similar to the authentication performed at the EPCIS Capture Interface level, means may be provided, for example, for a requesting EPCIS Accessing Application 512 or 514 to be authenticated through EPCIS Query Control Interface 510 or EPCIS Query Callback Interface 508. Once authenticated, EPCIS Accessing Application 514 may gain access to EPCIS data through an EPCIS interface based on the appropriate authorization associated with EPCIS Accessing Application 514.

Consistent with the principles of the present invention, an insurance provider may utilize the EPCIS to access accurate real-time information (e.g., EPC-related information) associated with the insured objects involved in an insurance policy. This real-time information may then be used to valuate or automatically adjust valuations, including, for example, insured values and insurance premiums, associated with the insurance policy.

Figure 6:
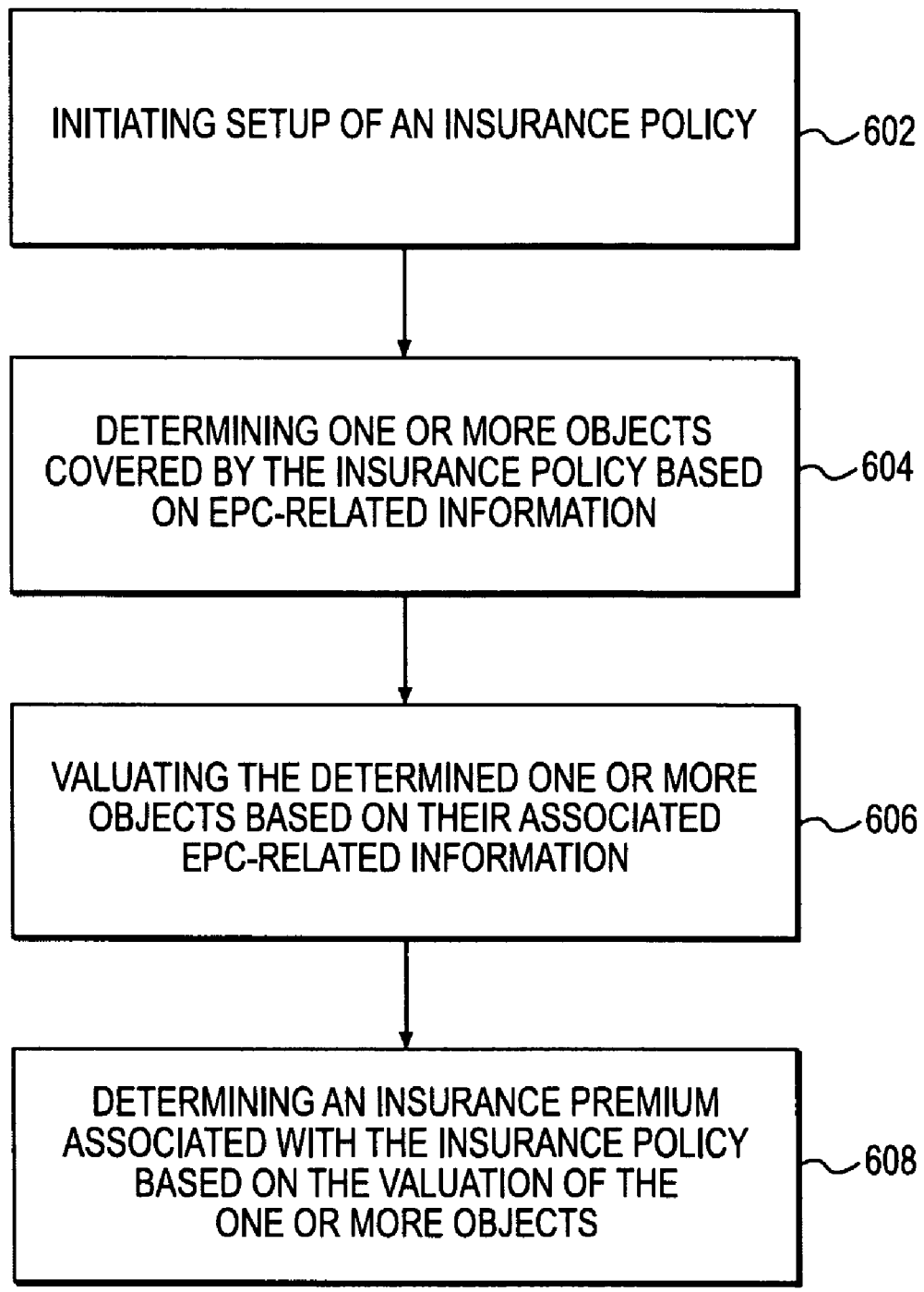
FIG. 6 shows a flowchart of suitable stages involved in making an initial insurance policy valuation based on EPC-related data.

FIG. 6 shows a flowchart of high-level stages involved in making an initial insurance policy valuation based on shared EPC-related information. It will be understood that the stages in FIG. 6 are merely illustrative of the valuation process. Stages may be added, removed, rearranged, or otherwise modified without departing from the spirit of the present invention. At stage 602, an individual and/or an organization may initiate setup of an insurance policy. For example, an individual may initiate setup of a home insurance policy, a car insurance policy, a business insurance policy, or any other suitable policy, for example, via the Internet, or any other suitable channel. Similarly, an organization may initiate an insurance policy setup for a business location or any other suitable insurable business asset.

At step 604, the specific objects involved in the insurance policy may be determined, for example, based on shared EPC-related data obtained via an EPCIS interface. As an example, for a home insurance policy, information associated with the home owner may be obtained. This information may be a centrally stored, for example, in a consumer profile, or may be stored separately by various enterprises/organizations that have interacted with the home owner. Regardless of how information associated with the consumer is stored, it may be access through the EPCIS interface because both consumer information and EPC-related object information may be shared within the same framework. For example, the individual information may include address information retrieved from a centralized consumer profile, from the consumer's credit card company, from a retailer from whom the consumer has previously purchased, or any other source that participates in the information sharing within the EPCIS framework.

In performing insurance valuation, information on the specific objects associated with the consumer's home address may be accessed through the EPCIS interface. In one embodiment, this information may be easily gathered, for example, from an RFID reader installed at the consumer's home (e.g., at the door). The reader may register every object baring a tag that passes through the door and may transfer this information to be stored, for example, in the consumer's profile. In another embodiment, the objects in the home may be indirectly identified from shared data stored disparately in the EPCIS framework and made accessible through the EPCIS interface. For example, a retailer may store information on the item (e.g., a television) that the consumer purchased from the retailer and may share this information within the EPCIS framework. A collection of such item information may be gathered from a variety of sources such as the retailer mentioned above to create a list of objects within the consumer's home.

A similar process may be used to gather information on a list of items currently residing in a commercial location (e.g., a warehouse), if the insurance policy is for an enterprise. In the commercial setting, it is much more likely that the content of the warehouse is already under monitor by an RFID or other reader on a real-time basis. This information may be obtained, for example, over a longer period, rather than a snapshot in time, to derive an average list of objects that are typically housed in the warehouse. It will be understood that stage 604 is merely illustrative. Any other suitable process for determining a list of objects covered by the insurance policy may be used without departing from the spirit of the present invention.

At stage 606, the objects identified in stage 604 may be valuated based on the EPC-related information associated with these objects. As previously mentioned, an RFID tag affixed to the object may contain a variety of information including, for example, an EPC for identifying the object, and may include other information such as the manufacturer, production date, special storage information, etc. Additional information may also have been collected and stored in association and in addition to the information on the RFID tag. This type of EPC-related information may include information generated by enterprises/organizations and/or individuals that have come into contact with an object since manufacturing. Such information may include, for example, indication whether the object (e.g., a television) has been repaired, how the object was transported, and other useful information that may impact the value of the object. Using this information, a value for the object may be determined, taking into account, for example, the age of the object (e.g., derived from the production date), the condition of the object (e.g., derived from the various handling of the object), the original retail value of the object, and any other suitable EPC-related information. It will be understood that the EPC-related data may be utilized in any manner to provide a suitable valuation without departing from the spirit of the present invention.

At stage 608, the valuation made at stage 606 may be used, in combination other considerations, to determine an insurance premium for the insurance policy. Some additional considerations derivable from the EPC-related information may include, for example, whether there are risks associated with the combination of objects stored together (e.g., whether flammable items are stored in the same location as heat sources); whether the values of the stored items change drastically over a short period of time (e.g., perishable); and/or any other suitable considerations. The EPC-related information on the object as well as other considerations derivable from such information may be used, for example, as input for premium calculation models to determine a premium that would ensure the appropriate coverage for both the insured and the insurance company. It will be understood that the UPC-related information may be used in any manner to determine an insurance premium for the insurance policy without departing from the spirit of the present invention.

Figure 7:
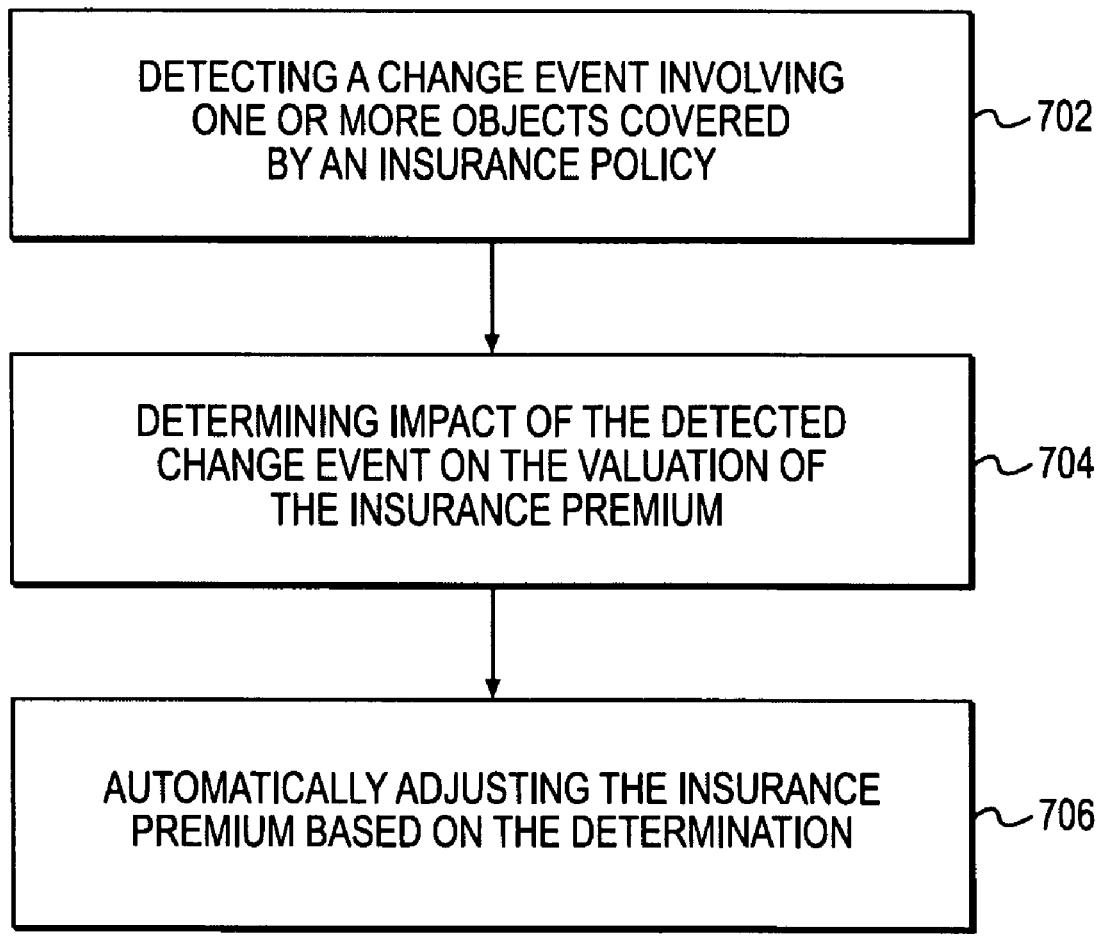
FIG. 7 shows a flowchart of suitable stages involved in automatically adjusting an insurance premium based on EPC-related data.

FIG. 7 shows a flowchart of illustrative stages involved in automatically adjusting insurance policy valuation based on shared EPC-related information. It will be understood that the stages in FIG. 7 are merely illustrate of the adjustment process. Stages may be added, removed, rearranged, or otherwise modified without departing from the spirit of the present invention.

At stage 702, a change event associated with an object covered by an insurance policy may be detected, for example, by a sensor located at the insured location. In one suitable arrangement, an RFID reader installed at the insured location may detect movements of tagged objects in and out and/or within the insured location. The reader may detect, for example, an insured equipment being removed from the insured warehouse. The reader may also detect, for example, that flammable material has been moved in close proximity to a heat source thereby increasing the risks associated with the insured location and/or objects. In another suitable arrangement, the detection of a change event may be made away from the insured location. For example, a consumer may make repair to a major appliance in the home, for example, at a repair shop, that significantly impacts the value of the appliance. The enterprise and/or individual handling the repair may collect and store EPC-related information associated with the appliance (e.g., by scanning the RFID tag affixed to the appliance). The collected EPC-related information may subsequently be shared through the EPCIS framework and may be detected in stage 702 as a change event. A variety of other change events may also be detected in various ways without departing from the spirit of the present invention.

In response to a change event detection, the insurance policy may be automatically revaluated to determine if the change has any impact on the insured value and/or the insurance premium at stage 704. This determination of impact may be based on, for example, EPC-related information associated with the object involved in the change event. The EPC-related information to be considered may include, for example, the changed object's retail value, age, handling history, and any other suitable factors. Other useful EPC-related information may include, for example, factors contributing to the changed environment (e.g., the addition of flammable materials) and/or any other suitable information.

At stage 706, the current insurance premium and/or insured amount may be automatically adjusted to reflect the impact of the change event in accordance with the revaluation at stage 704. In one suitable approach, the insured amount may be reduced, for example, by the value of a removed item. The insurance premium may also be adjusted accordingly, for example, based on an appropriate cost model, to correspond to the new insured amount. In another suitable approach, the insured amount may remain unchanged if the change event of stage 702 does not affect the actual value of the insured location and/or items. However, if the change event affects the risks surrounding the insured location and/or objects, the insurance premium may be automatically adjusted, for example, based on an appropriate risk model, even when the insured value is unchanged.

A computer system may be used to install a software application implementing a system and method for providing EPCIS interfaces capable of allowing one or more EPCIS accessing applications residing on a variety of systems and associated with a plurality of enterprises/organizations to receive EPC-related data. The computer system may be a computer network, as shown in FIG. 8, or a stand-alone personal computer (PC), as shown in FIG. 9.

Figure 8:
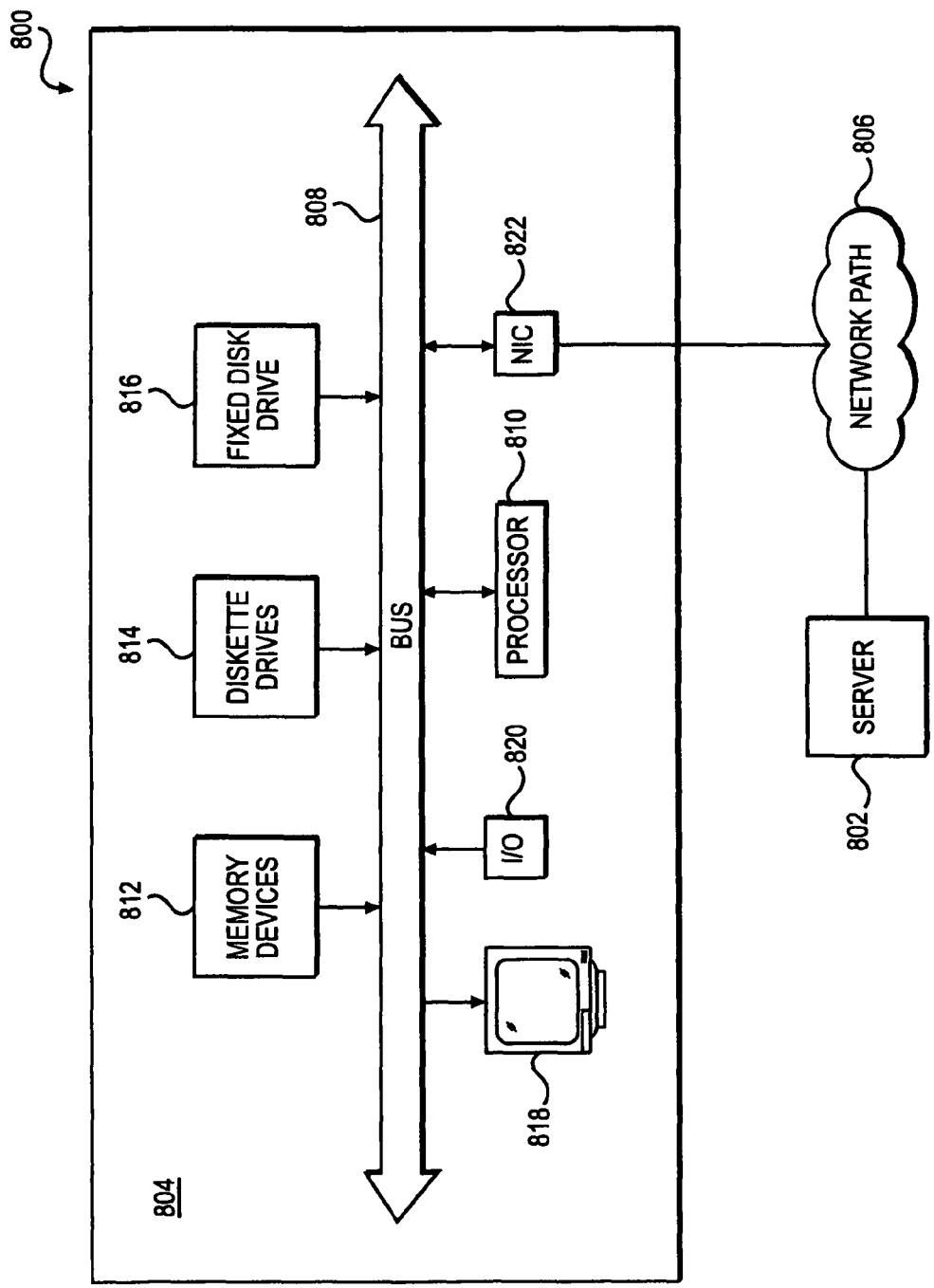
FIG. 8 shows a computer system capable of implementing elements of the EPCIS framework.
Figure 9:
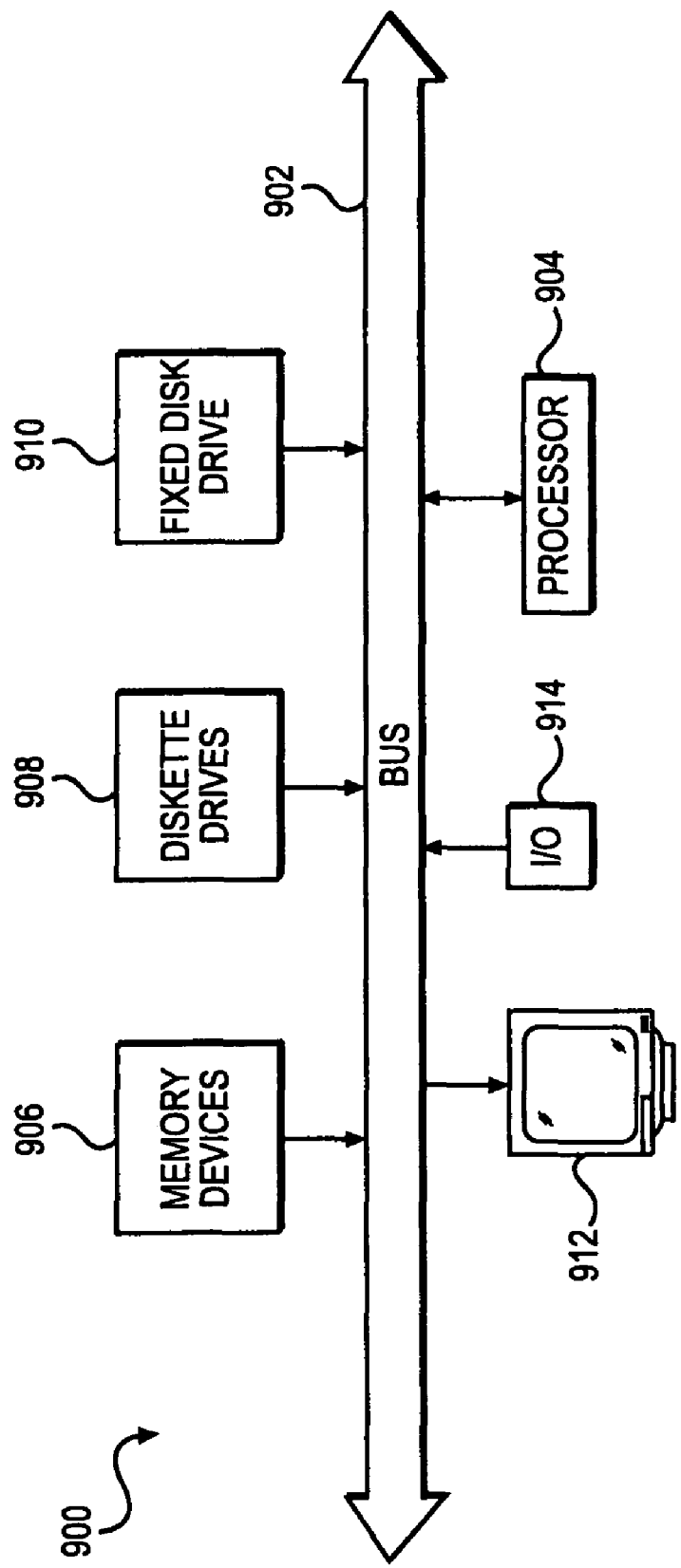
FIG. 9 shows another computer system capable of implementing elements of the EPCIS framework.

As shown in FIG. 8, a computer network 800 in accordance with systems consistent with the principles of the present invention may include a server 802 and a stand-alone PC 804 connected through a network path 806. Computer network 800 may be a local area network (LAN), where server 802 and PC 804 are workstations. Computer network 800 may also be the Internet, with server 802 hosting a web application and PC 804 being any workstation available to a user desiring to interface with the application on server 802. Alternatively, computer network 800 may be a wide area network (WAN), and server 802 and PC 804 may lie in two separate LANs connected through the Internet.

PC 804 may include a bus line 808 connecting a plurality of devices such as a processor 810, memory devices 812 for storage of information, diskette drives 814, a fixed disk drive 816, a monitor or display 818, other I/O devices 820, and a network interface card (NIC) 822. Processor 810 may be a microprocessor such as an Intel Pentium™ chip for processing applications. Memory devices 812 may include read-only memories (ROM) and/or random access memories (RAM). Diskette drives 814 may include a floppy drive and/or a compact disk (CD) drive. Fixed disk drive 816 may be a hard drive. I/O devices 820 may include a keyboard and/or a mouse for receiving input from a user of PC 804. Monitor or display 818 may display output from processor 810, and may also echo the input of the user. PC 804 may be connected to network path 806 through NIC 822.

A web application may be installed on server 802. An individual desiring to enter data into the application on server 802 may use a web browser loaded on PC 804, and may communicate with server 802 through NIC 822 and network path 806. In one aspect, software application for implementing a system consistent with the principles of the present invention may be stored in PC 804 and processor 810 of PC 804 may execute the software application locally within PC 804 and interface with a web application on server 802. Particularly, the software application may be stored on a floppy disk, a CD, or any other suitable readable media, which may be accessible by diskette drive 814, fixed disk drive 816, or any other suitable mechanism. In another aspect, the software application for implementing a system consistent with the principles of the present invention may be stored in server 802, which may execute the software application, and processor 810 of PC 804 may communicate with server 802 to send information to server 802 and retrieve the results of the execution of the software application from server 802.

Through the execution of the software application implementing a system consistent with the principles of the present invention, either locally within PC 804 or remotely within server 802, an interface or screen may be provided on a user display.

Alternatively, as shown in FIG. 9, a stand-alone PC 900 may be used for implementing a software application implementing a system consistent with the principles of the present invention. PC 900 may include a bus line 902 connecting a plurality of devices, which may include a processor 904, memory devices 906 for storage of information, diskette drives 908, a fixed disk drive 910, a monitor or display 912, and other I/O devices 914. Processor 904 may be a microprocessor such as an Intel Pentium™ chip for processing applications. Memory devices 906 may include ROM and/or RAM. Diskette drives 908 may include a floppy drive and/or a compact disk (CD) drive. Fixed disk drive 910 may be a hard drive. Monitor or display 912 may display the output of processor 904 and may also echo the input of the user. I/O devices 914 may include a keyboard and/or a mouse for receiving input from a user of PC 900.

A software application implementing a system consistent with the principles of the present invention may be stored on a floppy disk or a CD accessible by diskette drive 908 or on fixed disk drive 910. Processor 904 may execute the software application stored in the floppy disk the CD or the fixed disk drive 910. An individual, through monitor or display 912 and I/O devices 914, may interact with processor 904, which may execute the software application. A software application implementing a system consistent with the principles of the present invention may be written in any number of programming languages, including but not limited to JavaScript, Visual Basic, Flash, ABAP coding, or any other suitable language. Similarly, the present invention is not limited to use with certain applications, Internet browsers or operating systems.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM; or other forms of ROM or RAM. Accordingly, embodiments of the invention are not limited to the above described embodiments and examples, but instead is defined by the appended claims in light of their full scope of equivalents.

What is claimed is:

1. A method for providing an initial valuation of an insurance premium based on EPC-related data, comprising:
providing a plurality of program interfaces for allowing one or more accessing applications residing on a variety of systems to access shared EPC-related data,
the program interfaces forming a multi-layer framework including at least a service layer, a data definition layer, and an abstract data model layer,
the abstract data model layer defining the shared EPC-related data that includes master data and event data,
the event data describing a specific observation of the an Electronic Product Code (EPC) during a business process, and
the master data describing a business context for interpreting the event data;
initiating setup of an insurance policy;
determining one or more objects covered by the insurance policy based on EPC-related data associated with the one or more objects;
valuating the one or more objects based on the associated EPC-related data; and
determining an insurance premium for the insurance policy based on the valuation of the one or more objects.

2. The method of claim 1 further comprising determining an insured value for the insurance policy based on the valuation of the one or more objects.

3. The method of claim 1 further comprising:
detecting a change event associated with one or more of the objects covered by the insurance policy;
determining an impact of the detected change event on the valuation of the one or more objects; and
automatically adjusting the insurance premium based on the determined impact.

4. The method of claim 3 further comprising automatically adjusting the insured value of the insurance policy based on the determined impact.

5. The method of claim 1, wherein the EPC-related data associated with the objects include information of the objects collected by one or more of manufacturers, retailers, consumers, or insurers of the objects.

6. The method of claim 1, further comprising:
authenticating the one or more accessing applications for accessing the shared EPC-related data; and
transmitting the EPC-related data to the accessing applications in one of an on-demand pulling mode, a standing-request push mode, or a real-time push mode.

7. The method of claim 1, wherein the accessing applications reside within a plurality of organizations.

8. The method of claim 1, wherein:
the EPC-related data include historical data of the objects covered by the insurance policy; and
the method further comprises inferring a business context from the historical data.

9. The method of claim 1, wherein:
the service layer defines a service interface for allowing the accessing applications to access the shared EPC-related data.

10. A system for providing an initial valuation of an insurance premium based on EPC-related data, comprising:
a processor configured to:
provide a plurality of program interfaces for allowing one or more accessing applications residing on a variety of systems to access shared EPC-related data,
the program interfaces forming a multi-layer framework including at least a service layer, a data definition layer, and an abstract data model layer,
the abstract data model layer defining the shared EPC-related data that includes master data and event data,
the event data describing a specific observation of the an Electronic Product Code (EPC) during a business process, and
the master data describing a business context for interpreting the event data;
initiate setup of an insurance policy;
determine one or more objects covered by the insurance policy based on EPC-related data associated with the one or more objects;
valuate the one or more objects based on the associated EPC-related data; and
determine an insurance premium for the insurance policy based on the valuation of the one or more objects.

11. The method of claim 10 further comprising determining an insured value for the insurance policy based on the valuation of the one or more objects.

12. The system of claim 10, wherein the processor is further configured to:
detect a change event associated with one or more of the objects covered by the insurance policy;
determine an impact of the detected change event on the valuation of the one or more objects; and
automatically adjust the insurance premium based on the determined impact.

13. The system of claim 12, wherein the processor is further configured to automatically adjust the insured value of the insurance policy based on the determined impact.

14. The system of claim 10, wherein the EPC-related data associated with the objects include information of the objects collected by one or more of manufacturers, retailers, consumers, or insurers of the objects.

15. The system of claim 10, wherein the processor is further configured to:
authenticate the accessing applications for accessing the shared EPC-related data; and
transmit the EPC-related data to the accessing applications in one of an on-demand pulling mode, a standing-request push mode, or a real-time push mode.

16. The system of claim 10, wherein the accessing applications reside within a plurality of organizations.

17. The system of claim 10, wherein:
the EPC-related data include historical data of the objects covered by the insurance policy; and
the processor is further configured to infer a business context from the historical data.

18. The method of claim 10, wherein:
the service layer defines a service interface for allowing the accessing applications to access the shared EPC-related data.

19. A computer-readable medium having instructions thereon, when executed by a processor, performs a method comprising:
providing a plurality of program interfaces for allowing one or more accessing applications residing on a variety of systems to access shared EPC-related data,
the program interfaces forming a multi-layer framework including at least a service layer, a data definition layer, and an abstract data model layer,
the abstract data model layer defining the shared EPC-related data that includes master data and event data,
the event data describing a specific observation of the an Electronic Product Code (EPC) during a business process, and
the master data describing a business context for interpreting the event data;

initiating setup of an insurance policy;

determining one or more objects covered by the insurance policy based on EPC-related data associated with the one or more objects;

valuating the one or more objects based on the associated EPC-related data; and determining an insurance premium for the insurance policy based on the valuation of the one or more objects.

20. The computer-readable medium of claim 19 further includes instructions thereon for determining an insured value for the insurance policy based on the valuation of the one or more objects.

21. The computer-readable medium of claim 19 further includes instructions thereon for:

detecting a change event associated with one or more of the objects covered by the insurance policy;

determining an impact of the detected change event on the valuation of the one or more objects; and automatically adjusting the insurance premium based on the determined impact.

22. The computer-readable medium of claim 21 further includes instructions thereon for automatically adjusting the insured value of the insurance policy based on the determined impact.

23. The computer-readable medium of claim 19, wherein the EPC-related data associated with the objects include information of the objects collected by one or more of manufacturers, retailers, consumers, or insurers of the objects.

24. The computer-readable medium of claim 19, the method further comprising:

authenticating the one or more accessing applications for accessing the shared EPC-related data; and transmitting the EPC-related data to the accessing applications in one of an on-demand pulling mode, a standing-request push mode, or a real-time push mode.

25. The computer-readable medium of claim 19, wherein the accessing applications reside within a plurality of organizations.

26. The method of claim 19, wherein:

the EPC-related data include historical data of the objects covered by the insurance policy; and the method further comprises inferring a business context from the historical data.

27. The method of claim 19, wherein the program interfaces include a multi-layer framework having at least an abstract data model layer, a data definition layer, and a service layer.

28. The method of claim 19, wherein:

the service layer defines a service interface for allowing the one or more accessing applications to access the shared EPC-related data.

* * * * *